(12) United States Patent
Kim

(10) Patent No.: US 7,728,798 B2
(45) Date of Patent: Jun. 1, 2010

(54) LED DRIVER

(75) Inventor: Nam-in Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 724 days.

(21) Appl. No.: 11/263,019

(22) Filed: Nov. 1, 2005

(65) Prior Publication Data

US 2006/0192728 A1    Aug. 31, 2006

(30) Foreign Application Priority Data

Feb. 26, 2005    (KR)    ........................ 10-2005-0016209

(51) Int. Cl.
*G09G 3/32* (2006.01)
(52) U.S. Cl. .................... 345/82; 345/83; 345/102
(58) Field of Classification Search ......... 345/211–212, 345/76–77, 82–83, 102, 204, 205, 84, 87
See application file for complete search history.

(56) References Cited

U.S. PATENT DOCUMENTS

| | | | | |
|---|---|---|---|---|
| 5,426,446 | A * | 6/1995 | Takei et al. | .................... 345/82 |
| 6,618,031 | B1 * | 9/2003 | Bohn et al. | .................... 345/83 |
| 6,798,152 | B2 * | 9/2004 | Rooke et al. | ............ 315/209 R |
| 6,864,867 | B2 * | 3/2005 | Biebl | .......................... 345/82 |
| 6,980,181 | B2 * | 12/2005 | Sudo | .......................... 345/82 |
| 7,262,752 | B2 * | 8/2007 | Weindorf | .................... 345/82 |
| 2002/0167473 | A1 * | 11/2002 | Johnson et al. | ............... 345/76 |
| 2003/0095086 | A1 * | 5/2003 | Neuhaeusler et al. | ......... 345/82 |
| 2003/0112205 | A1 | 6/2003 | Yamada | |
| 2004/0090403 | A1 * | 5/2004 | Huang | .......................... 345/82 |
| 2004/0196225 | A1 * | 10/2004 | Shimada | ...................... 345/82 |
| 2004/0227704 | A1 | 11/2004 | Wang et al. | |
| 2004/0233148 | A1 | 11/2004 | Tanghe et al. | |
| 2005/0200290 | A1 * | 9/2005 | Sugimoto | .................. 315/118 |
| 2005/0225526 | A1 * | 10/2005 | Chiu et al. | .................... 345/98 |

(Continued)

FOREIGN PATENT DOCUMENTS

CN        1427382        7/2003

(Continued)

*Primary Examiner*—Amare Mengistu
*Assistant Examiner*—Koosha Sharifi
(74) *Attorney, Agent, or Firm*—Roylance, Abrams, Berdo & Goodman, L.L.P.

(57) ABSTRACT

The present invention relates to an LED driver for driving a plurality of light emitting diodes (LEDs), comprising a current controller to control power supply of a predetermined power source unit to make a current flowing in the plurality of LEDs reach a predetermined target current value which sequentially changes corresponding to the respective LEDs; a plurality of divergence switches to flow or interrupt the current with respect to each of the plurality of LEDs; a bypass switch being connected in parallel with respect to the plurality of divergence switches and the plurality of LEDs and to flow or bypass the current supplied to the plurality of LEDs by being open or short-circuited; and a switch controller to sequentially open and close the plurality of divergence switches corresponding to change of the target current value and control the bypass switch to be short-circuited in a range where the current supplied to the LEDs increases, corresponding to the rise of the target current value. Thus, the present invention provides an LED driver which drives an LED in a low voltage to improve light efficiency.

5 Claims, 7 Drawing Sheets

U.S. PATENT DOCUMENTS

| | | | |
|---|---|---|---|
| 2005/0243022 A1* | 11/2005 | Negru | 345/46 |
| 2006/0038803 A1* | 2/2006 | Miller et al. | 345/204 |
| 2006/0197469 A1* | 9/2006 | Kim | 315/291 |
| 2006/0220570 A1* | 10/2006 | Evans et al. | 315/86 |
| 2006/0232219 A1* | 10/2006 | Xu | 315/209 R |
| 2007/0171180 A1* | 7/2007 | Akiyama | 345/102 |

FOREIGN PATENT DOCUMENTS

| | | |
|---|---|---|
| CN | 1441399 | 9/2003 |
| EP | 1 341 147 | 9/2003 |
| JP | 2001-76525 | 3/2001 |
| JP | 2002-244619 | 8/2002 |
| JP | 2004-93761 | 3/2004 |
| JP | 2004-157225 | 6/2004 |

* cited by examiner

LED DRIVER

CROSS-REFERENCE TO RELATED APPLICATIONS

This application claims the benefit under 35 U.S.C. §119(a) of Korean Patent Application No. 2005-0016209, filed on Feb. 26, 2005, in the Korean Intellectual Property Office, the disclosure of which is incorporated herein by reference.

BACKGROUND OF THE INVENTION

1. Field of the Invention

The present invention relates to an LED driver. More particularly, the present invention relates to an LED driver, which drives light emitting diodes at low power to improve efficiency.

2. Description of the Related Art

Light emitting diodes (LEDs) are used as a light source of a liquid crystal display (LCD) apparatus, as well as a digital micromirror device (DMD) display apparatus such as a digital light processing (DLP) projection TV, a projector, and the like, using a DMD.

FIG. 1 illustrates the DMD display apparatus which employs LEDs as the light source. The DMD display apparatus employs a plurality of LED modules 210 corresponding to respective colors of red, green and blue (RGB).

The LED modules 210 are driven by an LED driver 200, and the driven LED modules 210 emit red green and blue light signals to sequentially project to the light onto a DMD module 230 through a lens 220. In a DMD, hundreds of thousands or even millions of mirrors 240 are integrated into the DMD module 230 by a micro electro-mechanical system (MEMS) process, and independently turn on and off. Accordingly, RGB color signals projected to the DMD module 230 display a predetermined picture on a screen 250.

A DMD display apparatus using LEDs as the light source has several advantages as compared with a conventional display apparatus using a discharging lamp as the light source. A DMD display apparatus has high light efficiency, a longer life span of the LEDs than the discharging lamp, and does not require a mechanical apparatus such as a color wheel.

The LED driver 200 for driving the LED modules 210 typically comprises a circuit configuration as shown in FIG. 2. The LED driver 200 in FIG. 2 may be referred to as a switch mode driving circuit. The LED driver 200 comprises a current detector, an error amplifier 272, a PWM modulator 274, a gate circuit 276, a switch 278, an inductor 280, a first diode 282, a second diode 284 and a switch block 286.

The LED driver 200 detects the current flowing in the LED modules 210 through the current detector, compares a voltage corresponding to the detected current to a target voltage Vref through the error amplifier 272, and outputs a voltage difference signal.

The PWM modulator 274 compares an output of the error amplifier 272 and a predetermined triangular wave, and generates a pulse width modulation (PWM) signal. The gate circuit 276 drives the switch 278 which is realizable as a metal-oxide semiconductor field effect transistor (MOSFET) by the pulse width modulation (PWM) signal. The inductor 280 integrates a square wave pulse output and allows the LED modules 210 to be supplied with a direct current having a ripple corresponding to the switching of switch 278.

As the amount of light for each of RGB colors is different in white light, the amount of current Io flowing in the LED modules 210 should be different for each of RGB colors, and it can be adjusted through the reference voltage Vref. The switch block 286 comprises a divergence switch which is connected to the LED module 210 corresponding to each of the RGB colors, and makes the current Io flow in the LED module 210 by synchronizing the switches 286 with changes of the reference voltage Vref. Thus, as Vref changes, the switches Vr, Vg and Vb turn on/off so that different levels of current flow through the LED's according to color.

The LED module 210 which is driven by the LED driver 200 comprises a single module that connects dozens of LEDs in serial/parallel corresponding to each of RGB colors. A current of more than 20 A and a voltage of more than 20V is typically used to drive the LED module 210. Also, the smaller the ripple of current Io is, the better it is for equalizing the characteristic of the picture quality. Also, the switching and the transient phenomenon should be fast for high light efficiency when sequentially driving the LED module 210 corresponding to each of RGB colors.

The driving circuit of the switch mode in FIG. 2 is enough to ensure high efficiency with respect to high power. However, because an inductor is used to reduce the ripple current, the switching frequency must be raised or the inductor must have a large inductance. As the inductance is raised, the transient phenomenon becomes slow, thereby lowering the light efficiency.

If driving the LED driver 200 with a discontinuous current mode (DCM) as illustrated in the pair of waveforms shown in the upper part in FIG. 3, a dead zone is lengthened in which the DMD can not operate due to the slow transient phenomenon of an inductor having a large inductance, thereby lowering the light efficiency.

As shown in a lower part of FIG. 3 as a pair of wave forms, the flow of the current Io is in a continuous current mode (CCM) and the light efficiency is increased a little if the dead zone is reduced while changing the divergence switch in the LED driver 200. However, a reverse recovery current is generated in the second diode 284 while changing the divergence switch, which may adversely affect the stability of the circuit and generate unwanted electromagnetic interference (EMI).

For example, the reverse recovery current generated while a current of about 20 A flows in the LED module 210 may be a few tens or hundreds of amps. As the reverse recovery current flows through the LED module 210, deterioration of the LEDs is accelerated. Also, the DMD module is turned off until the reverse recovery current disappears and the circuit is stabilized, thereby lowering the light efficiency.

Accordingly, there is a need to raise the light efficiency by minimizing the dead zone in the divergence switch without causing a reverse recovering current, and improving a transient response through increase of charging and discharging slopes of the current Io. The charging and discharging slopes of the current Io of the LED driver 200 are provided as Equations 1 and 2:

$$\frac{di}{dt} = \frac{Vcc - V_D}{L} \quad \text{[Equation 1]}$$

$$\frac{di}{dt} = \frac{V_D}{L} \quad \text{[Equation 2]}$$

where, Vcc refers to a power voltage, $V_D$ is a voltage applied to a diode, and L is the inductance of the inductor 280. Because $V_D$ is invariable, the discharging slope given in equation 2 is also invariable corresponding to a predetermined inductance. Meanwhile, the charging slope is variable as the Vcc can be changed.

The charging and discharging slopes of the current should be as large as possible to obtain a fast transient response for high light efficiency. As the discharging slope is fixed, the charging slope may be raised for a fast transient response. However, in order to adequately raise the charging slope, the power voltage Vcc may be too large. For example, the power voltage Vcc should be doubled relative to the LED voltage $V_D$ as Vcc=$2V_D$ to make the charging slope and the discharging slope identical. However, as the power voltage becomes large, accordingly a switching noise and the EMI becomes large and components having a of the ability to withstand the higher voltage are needed, thereby raising the production costs.

SUMMARY OF THE INVENTION

Accordingly, it is an aspect of the present invention to provide an LED driver which drives an LED at a low voltage while improving light efficiency.

Additional aspects and/or advantages of the invention will be set forth in part in the description which follows and, in part, will be obvious from the description, or may be learned by practice of the invention.

The foregoing and/or other aspects of the present invention are achieved by providing an LED driver for driving a plurality of light emitting diodes (LEDs), comprising a current controller to control a power supply of a predetermined power source unit to make a current flowing in the plurality of LEDs reach a predetermined target current value which sequentially changes corresponding to the respective LEDs; a plurality of divergence switches to flow or interrupt the current with respect to each of the plurality of LEDs; a bypass switch being connected in parallel with respect to the plurality of divergence switches and the plurality of LEDs in order to selectively bypass the current supplied to the plurality of LEDs by being open or short-circuited; and a switch controller to sequentially open and close the plurality of divergence switches corresponding to a change of the target current value and control the bypass switch to be short-circuited in a range where the current supplied to the LEDs increases, corresponding to the rise of the target current value.

According to an aspect of the present invention, the current controller comprises a switch to supply or cut off power from the power source unit; a current detector to detect the current flowing in the plurality of LEDs; an error amplifier to compare the current detected by the current detector and the target current value, and output a signal corresponding to difference between the current and the target current value; a pulse width modulator to generate a pulse width modulation signal corresponding to an output signal of the error amplifier to output it; a switch driver to drive the switch by outputting a signal for opening and closing the switch according to the pulse width modulation signal; an inductor to be connected in series between the power source unit and the plurality of LEDs, and to integrate a square wave current by supplying and cutting-off power of the power source unit; and a diode to freewheel the current flowing in the inductor if the switch is turned off.

According to an aspect of the present invention, a switch controller comprises a counter to count a clock signal having a predetermined frequency and sequentially output a signal respectively corresponding to the plurality of divergence switches; a decoder to decode the output signal of the counter and output a pulse signal having a logical high state in sequence, in parallel; a divergence switch driver to short-circuit or open the divergence switch as the respective output signals of the decoder change into the logical high state or into the logical low state; and a bypass switch driver to short-circuit the bypass switch if the logical state of the output signal of the decoder changes corresponding to the rise of the target current value.

According to an aspect of the present invention, the bypass switch driver opens the bypass switch when the current flowing in the bypass switch reaches the target current value if the bypass switch is closed.

According to an aspect of the present invention, the LED driver further comprises a microcomputer to output data of the target current value corresponding to a signal in the logical high state with respect to the respective pulse signals of the decoder; and a DA (digital-to-analog) converter to convert the data of the target current value outputted from the microcomputer into an analog signal to supply it to the current controller.

BRIEF DESCRIPTION OF THE DRAWINGS

The above and/or other aspects and advantages of the present invention will become apparent and more readily appreciated from the following description of the embodiments, taken in conjunction with the accompany drawings of which.

Throughout the drawings, like reference numbers will be understood to refer to like elements, features and structures.

DETAILED DESCRIPTION OF EXEMPLARY EMBODIMENTS

Figure 1:
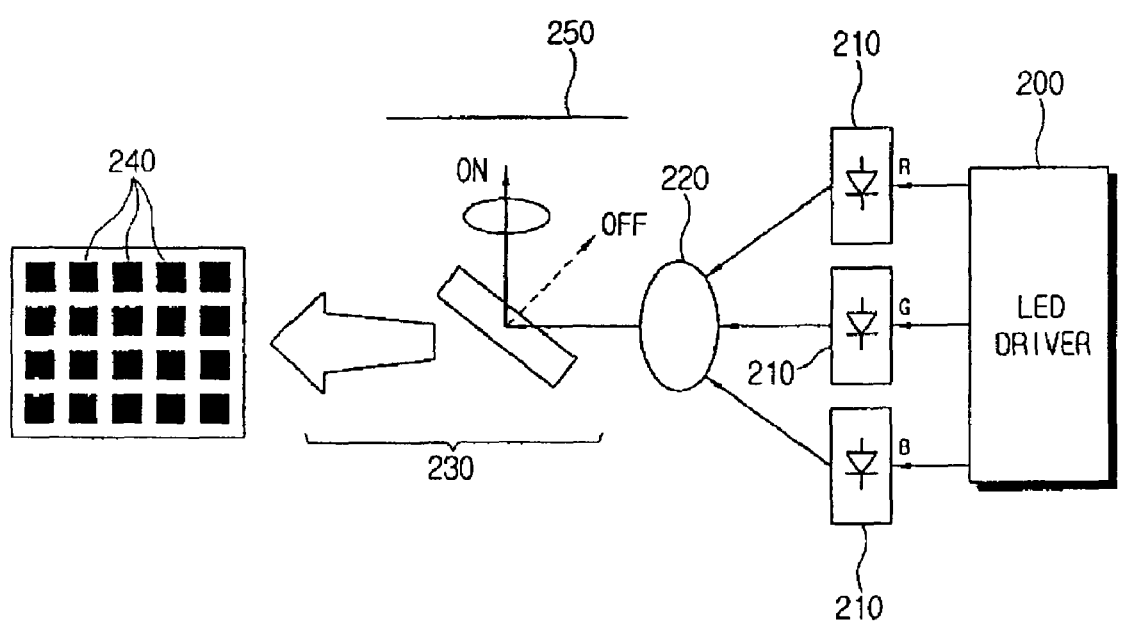
FIG. 1 illustrates a configuration of a digital micromirror device (DMD) display apparatus using a conventional LED driver.
Figure 2:
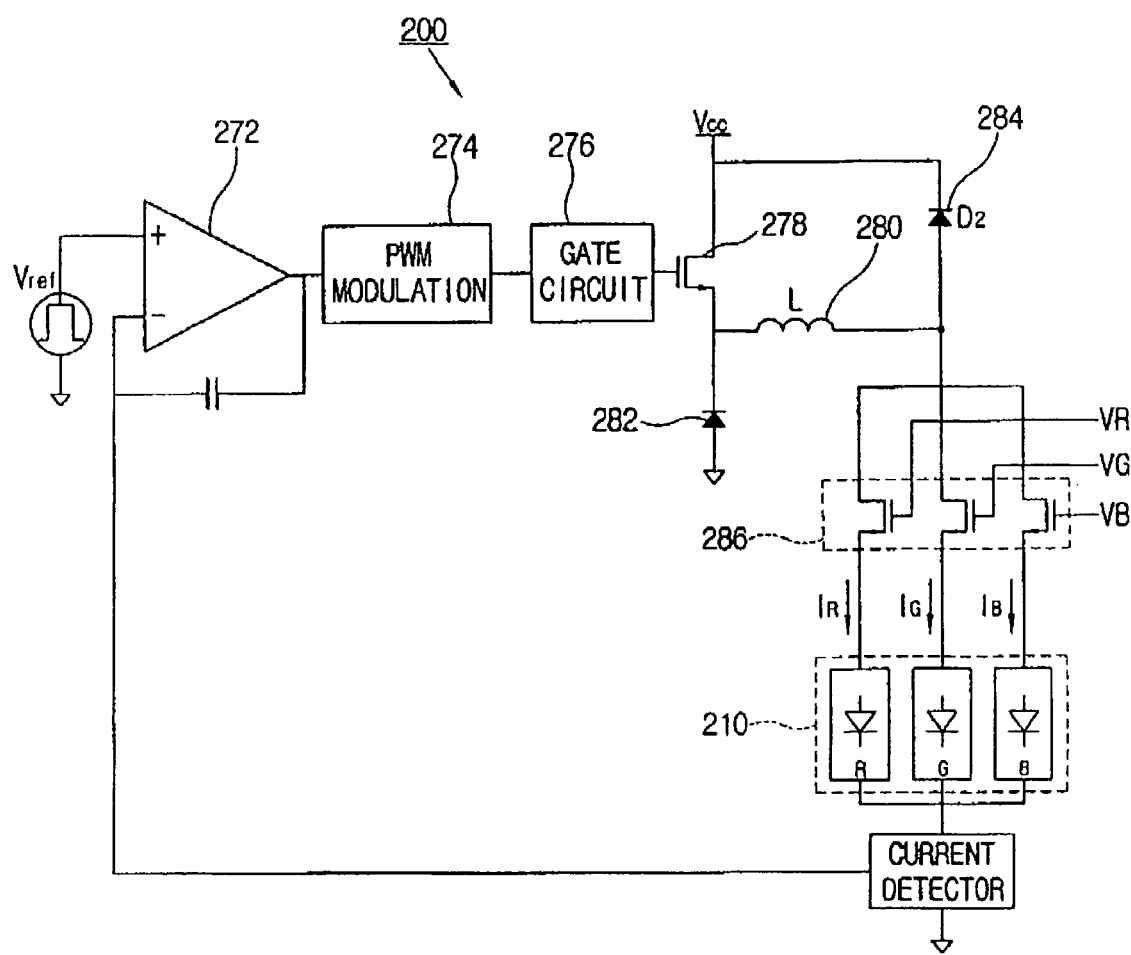
FIG. 2 illustrate a circuit configuration of the LED driver in FIG. 1.
Figure 3:
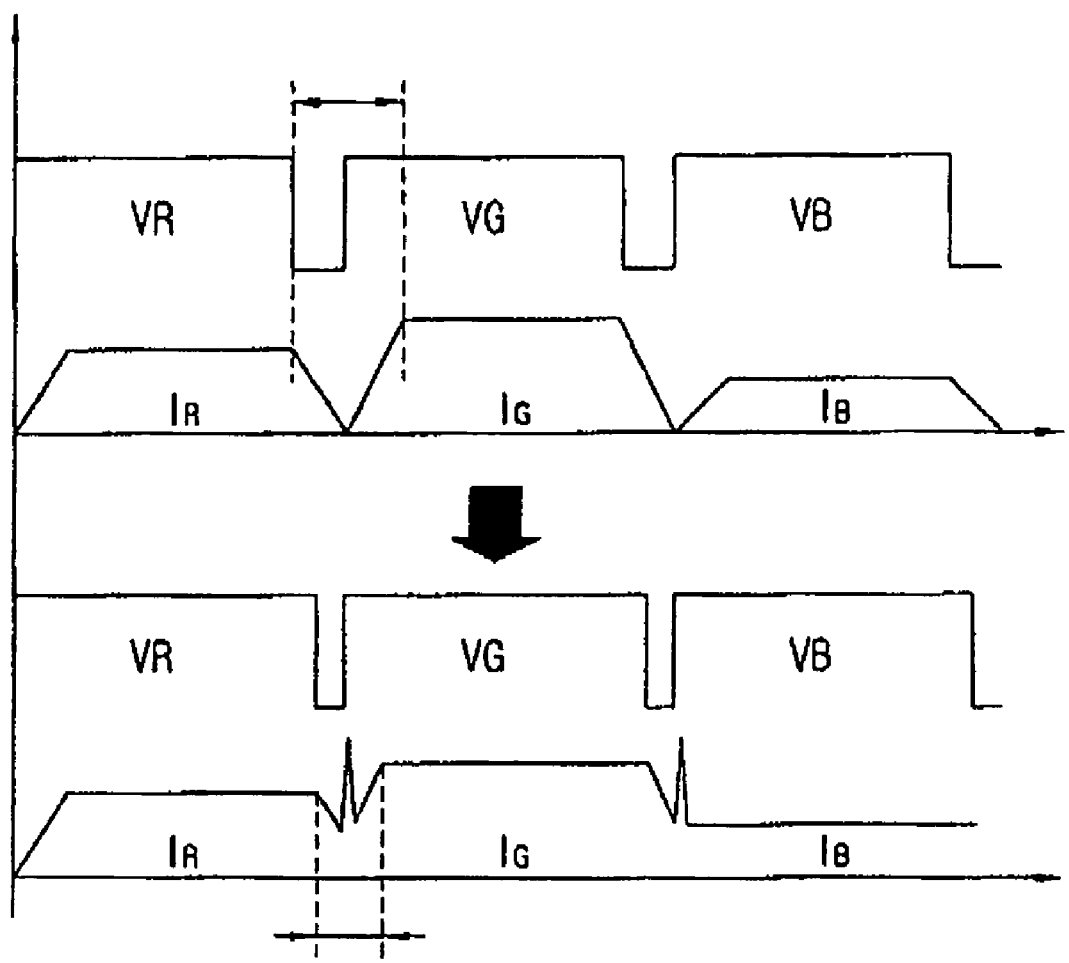
FIG. 3 illustrates wave forms of a gate voltage and an LED current of the LED driver shown in FIG. 1.
Figure 4:
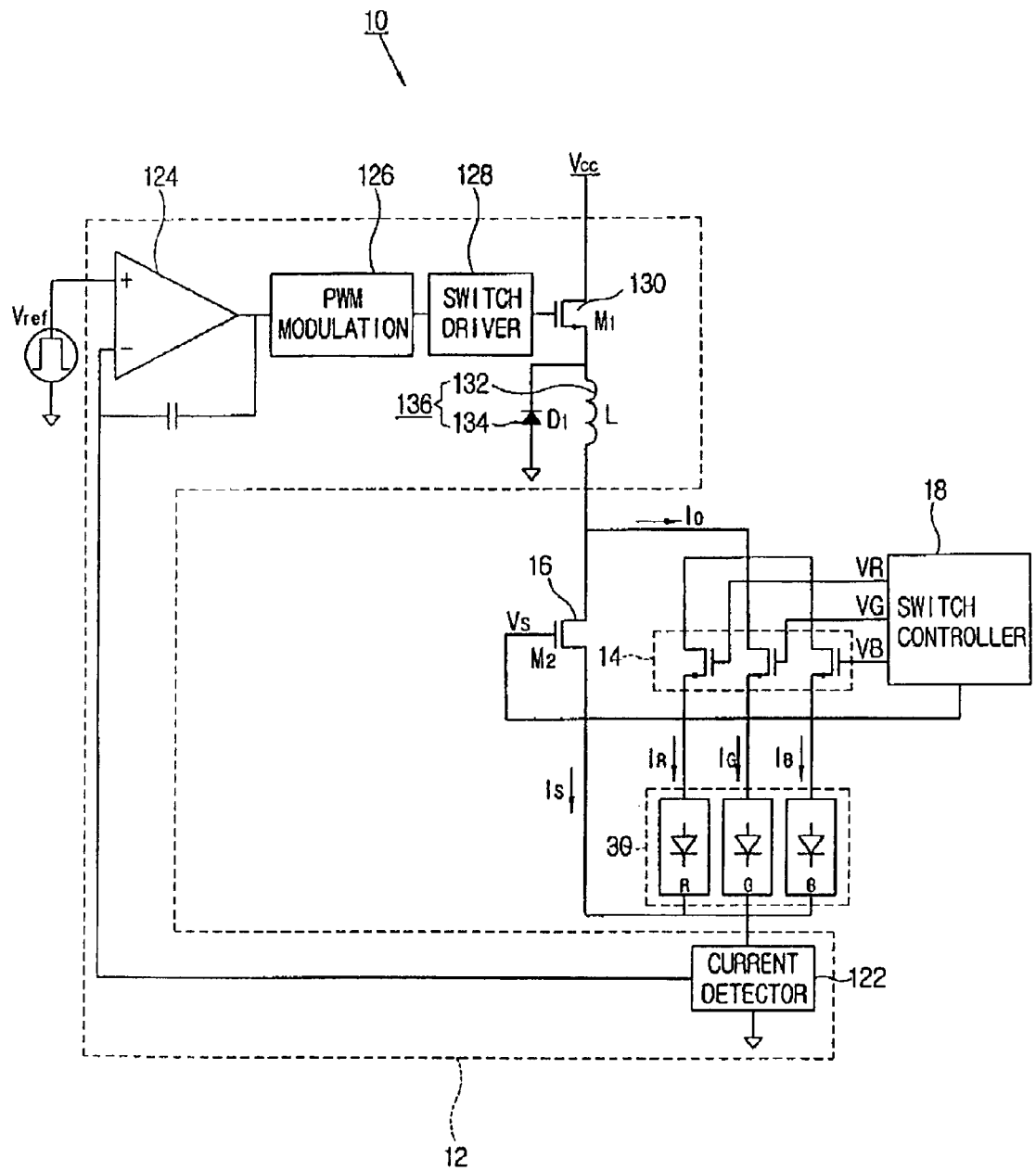
FIG. 4 illustrates a circuit configuration of an LED driver according to an embodiment of the present invention.

Reference will now be made in detail to exemplary embodiments of the present invention, which are illustrated in the accompanying drawings. The exemplary embodiments described below are not intended to be limiting, but rather are provided for a better understanding of the present invention. FIG. 4 illustrates a configuration of an LED driver 10 according to an embodiment of the present invention.

The LED driver 10 drives a plurality of LEDs 30 which are used as a light source of a digital micromirror device (DMD) display apparatus such as a digital light processing (DLP) projection TV, a projector, or the like using the DMD, and an LCD back light.

As shown in FIG. 4, the LED driver 10 comprises a current controller 12, a plurality of divergence switches 14, a bypass switch 16 and a switch controller 18. The plurality of divergence switches are disposed between the current controller 12 and anodes of the plurality of LEDs 30. Cathodes of the plurality of LEDs 30 are connected to the current controller 12. The bypass switch 16 is connected parallel to the plurality of divergence switches 14 and the plurality of LEDs 30. The divergence switches 14 are each connected in series with a respective one of the plurality of LEDs 30. Each of the plurality of LEDs 30 is preferably provided as a module comprising a plurality of LEDs corresponding to red, green or blue.

The current controller 12 makes a current Io flowing in the plurality of LEDs 30 reach a predetermined target current value. That is, the current controller 12 controls a power Vcc from a predetermined power source unit to be supplied or cut off with respect to the LEDs 30. Here, the target current value refers to a current to be applied to the plurality of LEDs 30. The target current value is preset corresponding to the LEDs 30, and sequentially changes according to the order of the red, green and blue colors in a predetermined interval.

As shown in FIG. 4, the current controller 12 comprises a current detector 122, an error amplifier 124, a pulse width modulator 126, a switch driver 128, a switch 130, an inductor 132 and a diode 134.

The current detector 122 detects the current Io flowing in the plurality of LEDs 30. The current detector 122 may be realized as a resistor having a predetermined resistance wherein a first end thereof is connected to the plurality of LEDs 30 and a second end thereof is connected to ground. In such an embodiment, the current Io flowing in the plurality of LEDs 30 may be calculated based on the voltage generated by the current Io flowing through the current detector 122 and the resistance of the current detector 122. Of course, any other suitable current detector could be used as a matter of design choice without departing from the scope and spirit of the invention.

A first end of the inductor 132 is connected to a first end of the switch 130 and a cathode of the diode 134, and a second end thereof is connected to the plurality of LEDs 30. The current flowing in the inductor 132 equals the total current Io flowing in the combination of the plurality of LEDs 30 and the bypass switch 16. An anode of the diode 134 is preferably connected to ground.

The switch 130 is preferably realized as a metal-oxide semiconductor field effect transistor (MOSFET). A gate of the switch 130 is connected to an output terminal of the switch driver 128, and a drain of the switch 130 is connected to the power source unit and receives the power voltage Vcc. Also, a source of the switch 130 is connected to the first end of the inductor 132 and the cathode of the diode 134.

The switch 130 is turned on and off according to the logical state of a gate voltage applied to the gate to perform a switching operation. If the switch 130 is turned on, current flows through the drain and the source, and the power voltage Vcc is applied to the inductor 132.

As Vcc is applied to the inductor 132, current through the inductor increases until the current flowing in the inductor 132 is charged to a predetermined level. If the switch 130 is turned off, the current flow through the drain and the source is cut off and the current charged in: the inductor 132 circulates from the diode 134 and through the LEDs 30. With switch 130 turned off, the current Io decreases at a rate dependent on the inductance of the inductor 132 since the power supply is cut off.

The error amplifier 124 receives a voltage corresponding to the current Io flowing in the plurality of LEDs 30 from the current detector 122 at an inverting input terminal, and the predetermined target voltage Vref corresponding to the target current value at a non-inverting input terminal. The error amplifier 124 amplifies a voltage difference between the voltage corresponding to the current Io flowing in the LEDs 30 and the target voltage Vref to output the difference as an output signal.

The pulse width modulator 126 generates a pulse width modulation signal corresponding to the output signal of the error amplifier 124 to output it. The switch driver 128 outputs a signal to open and close the switch 130 according to the pulse width modulation signal outputted from the pulse width modulator 126. That is, the current controller 12 of the embodiment detects the current Io flowing in the LEDs 30 and controls the switch 130 until the current Io reaches the predetermined target value.

The plurality of divergence switches 14 are connected to the anodes of the LEDs 30. The divergence switches 14 are turned on and off to supply and cut off the current Io corresponding to each color of the LEDs 30. The plurality of divergence switches 14 are preferably realized as metal-oxide semiconductor field effect transistors (MOSFETs).

The bypass switch 16 is connected parallel to the plurality of divergence switches 14 and the plurality of LEDs 30, and allows the current Io to bypass the plurality of LEDs 30 by being open or short-circuited through a control signal of the switch controller 18. The bypass switch 16 is also preferably realized as a MOSFET.

Figure 5:
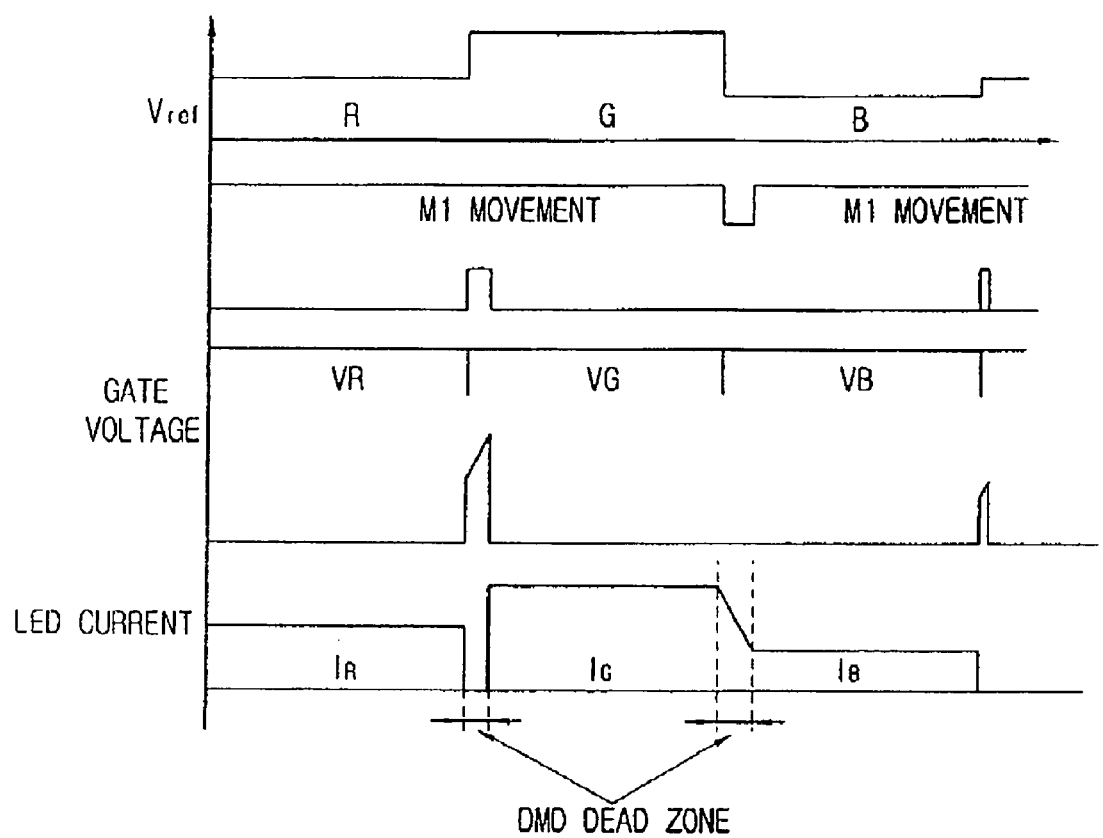
FIG. 5 illustrates wave forms of a target voltage, a gate voltage and an LED current of the LED driver shown in FIG. 4.

The switch controller 18 sequentially opens and closes the plurality of divergence switches 14 corresponding to changes of the target current value, and controls the bypass switch 16 to be short-circuited during the interval when the current supplied to the plurality of LEDs 30 increases corresponding to the rise of the target current value. FIG. 5 illustrates wave forms of the target voltage Vref driving the switch controller 18, the gate voltages $V_R$, $V_G$, $V_B$ and $V_S$ supplied to the gates of the respective divergence switches 14 and the bypass switch 16 and the current Io flowing in the LEDs 30.

If the target current value increases, and the target voltage Vref corresponding to the target current value increases, the switch controller 18 turns on the bypass switch 16, thereby bypassing the current Io supplied to the LEDs 30. As the current Io is not applied to the LEDs 30, there is no voltage drop by the LEDs 30 and the rate of increase of the current value is at the maximum. If the target current value increases, the power voltage may be minimized. The charging slope and the discharging slope of the current Io are shown as following Equations 3 and 4.

$$\frac{di}{dt} = \frac{Vcc}{L} \qquad \text{[Equation 3]}$$

$$\frac{di}{dt} = \frac{V_D}{L} \qquad \text{[Equation 4]}$$

As described above, the required power voltage Vcc becomes $VCC=V_D$ to make the charging slope and the discharging slope of the current Io identical each other. Accordingly, the same transient response time may be obtained through a power voltage much smaller than $2V_D$ as described above in connection with the conventional arrangement. Meanwhile, as the rate of increase of the current Io is at a maximum, the time for the current Io to reach the target current value, that is, the transient response time may be minimized.

Figure 6:
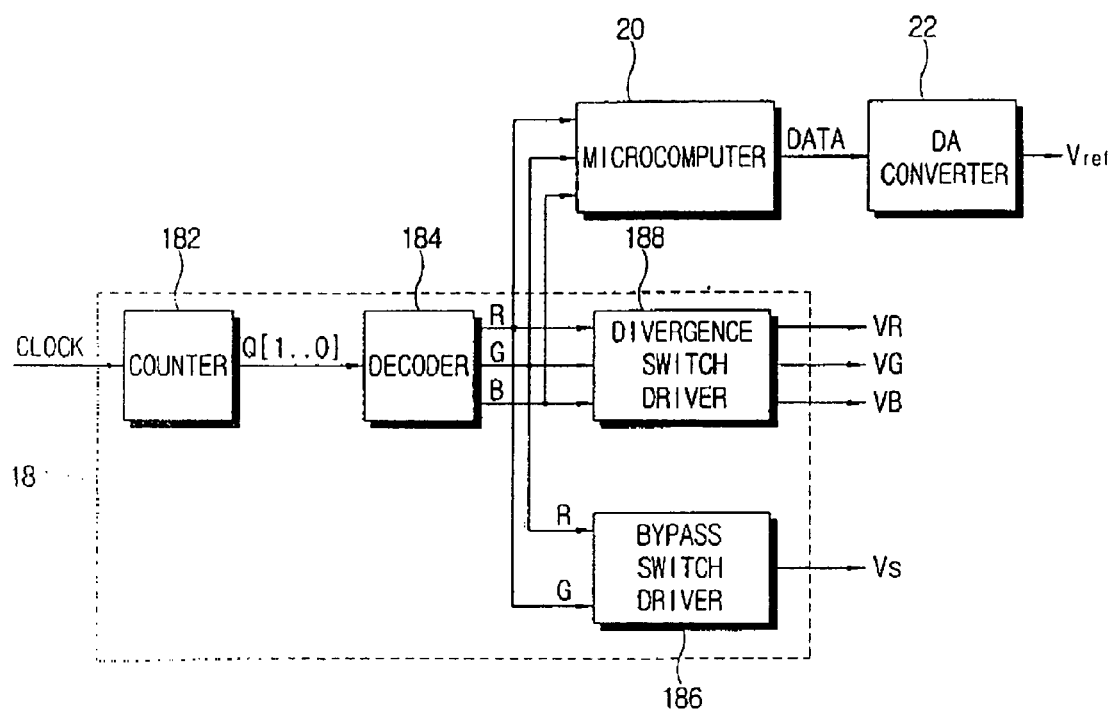
FIG. 6 illustrates an internal configuration of a switch controller of the LED driver shown in FIG. 4.

As shown in FIG. 6, an exemplary switch controller 18 comprises a counter 182, a decoder 184, a divergence switch driver 188 and a bypass switch driver 186.

Figure 7:
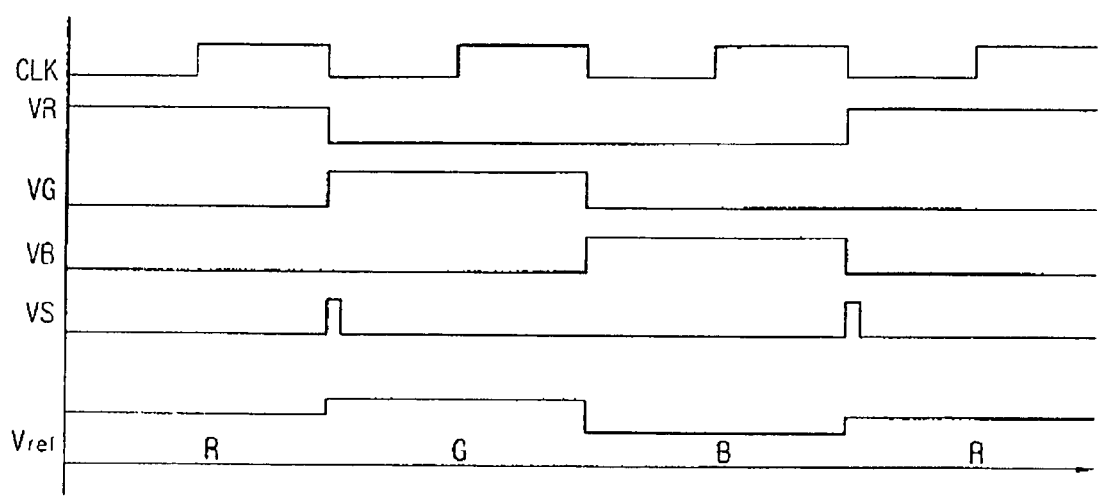
FIG. 7 illustrates wave forms of respective voltages and currents of the switch controller shown in FIG. 6.

The counter 182 receives a clock signal (CLK in FIG. 7) having a predetermined frequency and counts the clock signal to sequentially output a signal Q[1 . . . 0] respectively corresponding to the divergence switch 14 of RGB colors. That is, the counter 182 is a ternary counter which counts the clock signal, and outputs a two-bit output signal (00→01→10→00 . . . ) for three conditions corresponding to the respective RGB colors. The decoder 184 decodes the output signal of the counter 182 and outputs a pulse signal having a logical high state in sequence, in parallel. That is, the decoder 184 receives the two-bit signal (00→01→10→00 . . . ) from the counter 182 indicating the three conditions corresponding to the respective RGB colors and decodes it to make three pulse signals have the logical high state through three output ports, in sequence.

If the output signal of the counter 182 is "00", the decoder 184 of the embodiment makes a signal corresponding to "R" be in the logical high state and signals corresponding to "G" and "B" be in the logical low state. If the output signal of the counter 182 is "01", the decoder 184 makes the signal corresponding to "G" be in the logical high state, and the signals corresponding to "B" and "R" be in the logical low state. If the output signal of the counter 182 is "10", the decoder 184 makes the signal corresponding to "B" be in the logical high state, and the signals corresponding to "R" and "G" be in the logical low state. The change of the logical state of the pulse signal corresponding to a pair among R, G, B preferably occurs simultaneously at a predetermined, interval.

The divergence switch driver 188 outputs gate signals ($V_R$, $V_G$ and $V_B$ in FIG. 7) turning on and off the divergence switch 14 as the respective output signals of the decoder 184 change into the logical high state or the logical low state, to the gate of the divergence switch 14.

If the logical state of the output signal of the decoder 184 changes corresponding to a rise of the target current value, the bypass switch driver 186 outputs the gate signal Vs to the gate of the bypass switch 16, which short-circuits the bypass switch 16. The bypass switch driver 186 receives the output signal of the decoder 184 corresponding to the rise of the target current value among R, G and B, and outputs the gate signal $V_S$ in the logical high state for a predetermined period of time when the logical state of the corresponding signal changes. If the size of the target current value is G>R>B, the bypass switch driver 186 outputs the gate signal $V_S$ in the logical high state for a predetermined period of time if the target current value increases, that is, when the target current value changes from "R" to "G", and from "B" to "R".

The bypass switch driver 186 preferably receives the signals corresponding to "G" and "R", and checks whether the logical state of the gate signal Vs changes to a high state, thereby possibly changing the logical state of the gate signal Vs. In another embodiment, the bypass switch driver 186 receives the signals corresponding to "R" and "B", and checks whether the logical state thereof changes to a low state, thereby possibly changing the logical state of the gate signal Vs. In any case, the bypass switch driver 186 receives the target current value whose size is preset corresponding to R, G and B, and checks the output signal of the decoder 184 of the color corresponding to the rise of the target current value.

If the target current value increases, the bypass switch driver 186 preferably maintains the logical state of the gate signal $V_S$ until the current Io reaches the target current value. Accordingly, the time for the current Io to reach the target current value, that is, the transient response time is minimized corresponding to the rise of the target current value.

The LED driver 10 may comprise a microcomputer 20 to output data indicating the target current value corresponding to the signal in the logical high state with respect to the respective pulse signals of the decoder 184. The microcomputer 20 sets up data indicating target current values $I_R$, $I_G$ and $I_B$ of the plurality of LEDs 30 in advance corresponding to values of R, G and B of an image signal to be outputted. Also the microcomputer 20 receives three pulse signals corresponding to R, G and B. Subsequently, the microcomputer 20 checks the logical state of the respective pulse signals and output data indicating the target current values $I_R$, $I_G$ or $I_B$ corresponding to the color of the pulse signal in the logical high state. The microcomputer 20 outputs data of the target voltage Vref corresponding to the target current values $I_R$, $I_G$ or $I_B$. The microcomputer 20 may be realized as a general microprocessor, and comprise a memory such as a ROM and a RAM as necessary.

The LED driver 10 may further comprise a DA (digital-to-analog) converter 22 which converts the data indicating the target current values $I_R$, $I_G$ and $I_B$ outputted from the microcomputer 20 into an analog signal and provides them to the current controller 12.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. An LED driver for driving a plurality of light emitting diodes (LEDs), used as light sources corresponding to red, green and blue (RGB), comprising:
   a current controller to control a power supply of a predetermined power source unit to make a current flowing in the plurality of LEDs reach a predetermined target current value which value sequentially changes corresponding to an emitting order of the RGB LEDs;
   a plurality of divergence switches to prevent or permit current to flow through each of the plurality of LEDs;
   a bypass switch being connected parallel to the plurality of divergence switches and the plurality of LEDs to bypass the current supplied to the plurality of LEDs by being closed; and
   a switch controller to sequentially open and close the plurality of divergence switches corresponding to a change of the target current value and control the bypass switch to be short-circuited during a predetermined interval corresponding to the rise of the predetermined target current value,
   wherein the switch controller opens the bypass switch when the current flowing in the bypass switch reaches the target current value.

2. The LED driver according to claim 1, wherein the current controller comprises a switch to supply or cut off power of the power source unit; a current detector to detect the current flowing in the plurality of LEDs; an error amplifier to compare the current detected by the current detector and the target current value, and output a signal corresponding to difference between the current and the target current value; a pulse width modulator to generate a pulse width modulation signal corresponding to an output signal of the error amplifier to output it; a switch driver to drive the switch by outputting a signal opening and closing the switch according to the pulse width modulation signal; an inductor to be connected in serial between the power source unit and the plurality of LEDs, and integrate a square wave current by supplying and cutting-off power of the power source unit; and a diode to freewheel the current flowing in the inductor if the switch is turned off.

3. The LED driver according to claim 1, wherein the switch controller comprises a counter to count a clock signal having a predetermined frequency and sequentially output a signal respectively corresponding to the plurality of divergence switches; a decoder to decode the output signal of the counter and output a plurality of pulse signals in sequence, the plurality of pulse signals corresponding to the plurality of LEDs and having a logical high state; a divergence switch driver to short-circuit or open the divergence switch corresponding as the respective output signals of the decoder change into the logical high state or into the logical low state; and a bypass switch driver to short-circuit the bypass switch if the logical state of the output signal of the decoder changes corresponding to the rise of the target current value.

4. The LED driver according to claim 3, further comprising a microcomputer to output data of the target current value corresponding to a signal in the logical high state with respect to the respective pulse signals of the decoder; and a DA (digital-to-analog) converter to convert the data of the target current value outputted from the microcomputer into an analog signal to supply it to the current controller.

5. A method of driving a plurality of light emitting diodes (LEDs) used as light sources corresponding to red, green and blue (RGB), with an LED driver comprising a switch controller adapted to control a plurality of divergence switches corresponding to the RGB LEDs based on a level of a reference voltage, said switches adapted to permit or prevent current flowing in said LEDs, and a bypass switch connected parallel to said divergence switches and said LEDs, comprising the steps of:

controlling a power supply of a predetermined power source unit to make a current flowing in the plurality of LEDs reach a predetermined target current value which sequentially changes corresponding to an emitting order of the RGB LEDs; and sequentially opening and closing the plurality of divergence switches corresponding to a change of the target current value, controlling the bypass switch to be short-circuited during a predetermined interval corresponding to the rise of the predetermined target current value, and controlling the bypass switch to be open when the current flowing in the bypass switch reaches the target current value.

* * * * *